US006740283B2

(12) United States Patent
Matsui et al.

(10) Patent No.: US 6,740,283 B2
(45) Date of Patent: May 25, 2004

(54) MOLDING SYSTEM AND RELATED METHOD USING A SIDE-GATED INJECTION MOLD WITH VACUUM ASSIST AND RESULTING BLOW MOLDED ARTICLE

(75) Inventors: Yutaka Matsui, Bardstown, KY (US); Jun Murase, Bardstown, KY (US)

(73) Assignee: Inoac Packaging Group Inc., Bardstown, KY (US)

( * ) Notice: Subject to any disclaimer, the term of this patent is extended or adjusted under 35 U.S.C. 154(b) by 0 days.

(21) Appl. No.: 09/874,683

(22) Filed: Jun. 5, 2001

(65) Prior Publication Data

US 2002/0179613 A1 Dec. 5, 2002

(51) Int. Cl.[7] ............................................... B29C 49/22
(52) U.S. Cl. .................... 264/509; 264/513; 264/537; 264/571; 264/132
(58) Field of Search .................. 264/509, 537, 264/571, 513, 132

(56) References Cited

U.S. PATENT DOCUMENTS

| | | |
|---|---|---|
| 2,450,482 A | 10/1948 | Morin |
| 2,559,861 A | 7/1951 | Fay |
| 3,881,854 A | 5/1975 | Rainville |
| 3,947,176 A | 3/1976 | Rainville |
| 3,990,826 A | 11/1976 | Marcus |
| 4,020,137 A | 4/1977 | Lachner et al. |
| 4,061,705 A | 12/1977 | Marcus |
| 4,065,246 A | 12/1977 | Marcus |
| 4,091,069 A | 5/1978 | Allen |
| 4,177,238 A | 12/1979 | Allen |
| 4,289,726 A | 9/1981 | Potoczky |
| 4,375,947 A | 3/1983 | Marcus |
| 4,376,090 A | 3/1983 | Marcus |
| 4,622,002 A | 11/1986 | Bormuth |
| 4,707,966 A | 11/1987 | Weiler et al. |
| 4,726,925 A | 2/1988 | Binder |
| 4,941,815 A | 7/1990 | Julian |
| 4,942,010 A | 7/1990 | Baker |
| 4,950,143 A | 8/1990 | Krishnakumar et al. |
| 4,965,028 A | 10/1990 | Maus et al. |
| 5,139,724 A | 8/1992 | Hofstetter et al. |
| 5,145,630 A | 9/1992 | Schad |
| 5,288,451 A | 2/1994 | Schad |
| 5,474,735 A | 12/1995 | Krishnakumar et al. |
| 5,603,219 A | 2/1997 | Kolb |
| 5,636,767 A | 6/1997 | Vogrin |
| 5,687,542 A | 11/1997 | Lawecki et al. |
| 5,700,415 A | 12/1997 | Hiroki et al. |
| 5,798,069 A | 8/1998 | Bertschi et al. |
| 5,843,495 A | 12/1998 | Yamada |
| 5,851,471 A | 12/1998 | Schloss et al. |
| 5,952,016 A | 9/1999 | Gellert |
| 5,953,884 A | 9/1999 | Lawecki et al. |
| 5,965,081 A | 10/1999 | Schloss et al. |
| 5,972,255 A | 10/1999 | Takada et al. |
| 6,019,933 A | 2/2000 | Takada et al. |
| 6,051,295 A | 4/2000 | Schloss et al. |

FOREIGN PATENT DOCUMENTS

| | | |
|---|---|---|
| JP | 02/032494 | 10/1991 |
| JP | 08/202459 | 2/1998 |
| WO | PCT/JP97/02607 | 5/1998 |

OTHER PUBLICATIONS

Kenneth Y. Maxon, "Injection Molding Basics for the Minimal Mold," Encoder, The Newsletter of the Seattle Robotics Society.

*Primary Examiner*—Suzanne E. McDowell
(74) *Attorney, Agent, or Firm*—King & Schickli, PLLC

(57) ABSTRACT

A molding system and related method for forming a molded article, such as a container, is disclosed. In one embodiment, the injection material is supplied though a side gate and drawn into the mold cavity using a vacuum assist and optional heating of the mold portions, if necessary. This creates a preform having a closed end with a smooth outer surface without gate marks or other vestiges of the injection molding process. The preform is then blow molded to form an article or container having a smooth outer surface adjacent to a closed end thereof.

20 Claims, 7 Drawing Sheets

MOLDING SYSTEM AND RELATED METHOD USING A SIDE-GATED INJECTION MOLD WITH VACUUM ASSIST AND RESULTING BLOW MOLDED ARTICLE

TECHNICAL FIELD

The present invention is directed to the molding of plastic containers or articles and, more particularly, to a molding system and related method using combined blow molding and injection molding techniques to form an article or container having a smooth outer surface adjacent to a closed end thereof.

BACKGROUND OF THE INVENTION

The use of molded plastic containers continues to grow in the consumer market at a rapid rate and promises to continue in years to come. For many products, such as liquid or semi-liquid (viscous) cosmetics or the like, the plastic container, such as a bottle or jar, is by far the most popular. Advantageously, a plastic container is not only non-breakable, but can be molded into different shapes so as to be very attractive, as well as functional. In addition, from a cost standpoint, the use of plastic is competitive with the other materials often used to form containers, such as glass.

One of the most popular containers used for cosmetics, as well as other liquid and semi-liquid products, is the blow molded bottle or jar. Usually, the containers are fabricated of a clear, translucent or opaque plastic material. For example, polyethylene terephthalate (PET) with additives for varying light transmission and/or color is used to form most types of cosmetic containers. Of course, other materials can also be chosen depending on various factors, such as the type of product contained, the desired size or shape of the container, the expected or required service life, any recycling/environmental considerations, or inherent cost constraints.

In addition to merely containing the product, the container should have an appearance that is pleasing to the eye, since the aesthetics may ultimately influence the customer's decision to select one product over another and/or consummate the purchase. As noted above, the attractiveness of the container may be significantly enhanced by forming it having a distinctive or irregular shape, as well as by using eye-catching colors and intricate surface patterns or designs. Many different types of containers embodying some or all of these features are well known in the art, and are commonly used as part of an overall marketing strategy in an effort to boost sales over the competition.

In the case of the popular blow molded plastic container, a preform created using conventional injection molding techniques is blown and/or stretched into a mold cavity, usually with the simultaneous application of heat. The preform is typically formed in a tubular shape, with a neck adjacent to the open end and a "bottom" area at the opposite, closed end that may form the support surface or bottom of the resulting container once blow molding is complete. The neck normally includes the opening that receives the blow air and/or stretch rod, as well as the threads that allow for a cap or cover to be removably secured to contain and/or dispense the product held in the container. The neck typically does not experience any stretching during blow molding, which allows the size and shape of the threads and opening to be predetermined.

One limitation resulting from the conventional injection molding process is the creation of a mark or vestige in the preform at the location where the material is injected through a gate in the mold leading to the cavity. In the usual process, this gate mark is located at the outside surface adjacent to the closed end of the tubular preform. Hence, it is also present at this same location in the resulting blow molded article or container.

For articles or containers that are positioned upright in use, the gate mark is usually hidden from view and does not significantly detract from the overall aesthetics or appearance (although from a functional standpoint, it may be necessary to contour the bottom portion of the blow mold cavity such that a support lip or ledge is defined around the gate mark to prevent it from affecting the ability of the article or container to stand upright). However, the presence of the gate mark on the container is still unacceptable in some instances, including when: (1) the container is inverted in use, in which case the outer surface adjacent to the closed end of the preform becomes the outer surface of the upper portion of the container; and/or (2) a decoration, such as a stamping, engraving, label, or the like is to be placed on the closed end of the container over the area where the gate mark is usually located.

To move the gate mark to a less obtrusive location, others in the past have proposed using a side or neck gating technique to form an injection molded preform that is later blow molded into a hollow container. Perhaps the earliest examples are found in U.S. Pat. Nos. 3,947,176 and 3,881,854, both to Rainville, which concern forming spherical, smooth bottomed, blow-molded articles, such as Christmas ornaments, using combined injection and blow molding techniques. A more recent example is found in Coca-Cola's U.S. Pat. No. 5,965,081 to Schloss et al. The '081 patent is primarily directed to forming a multi-layered preform using side gating techniques, which is supposed to enhance the strength of the bottom area of the resulting blow molded container by eliminating the undesirable crystallization that results from the conventional location of the gate mark at the closed end. The disclosures of each of these patents are incorporated herein by reference.

While these techniques may allow for the creation of a blow molded container having the desired smooth outer surface along a closed end, it is extraordinarily difficult in practice to ensure that the injection material penetrates or reaches all areas of the corresponding mold cavity when only a single side or neck gate is used. If sufficient penetration is not achieved, air bubbles, thin areas or holes may be created in the preform, which may render it unsuitable for later use in blow molding. While defective containers created from such misformed preforms may of course be recycled, the end result is an increase in cost and a decrease in the efficiency of the overall molding operation. Accordingly, the need for an improvement in the combined injection and blow molding art, especially in terms of reliability and efficiency, is identified.

SUMMARY OF THE INVENTION

In accordance with a first aspect of the invention, a method of forming a container having an open end and a closed end using combined injection and blow molding techniques is disclosed. The method includes injecting a material through a side gate into an injection mold cavity having a closed end portion, drawing the material into the injection mold cavity using a vacuum, and cooling the material in the mold cavity to form a tubular preform with a closed end having a substantially smooth outer surface. The method further includes blow molding the preform to create the container having a predetermined shape. As a result of forming the preform using the side gate along with a vacuum assist, the resulting blow molded container has a substantially smooth outer surface along the closed end that is free from defects.

In one embodiment, the injection mold cavity includes a neck portion, and the injecting step comprises injecting the material through the gate to the neck portion of the injection mold cavity. Also, at least a portion of the injection mold cavity may be defined by a porous material, in which case the step of drawing the material into the injection mold cavity comprises placing a vacuum source in fluid communication with the porous material. The vacuum action thus created assists in ensuring that the injection material completely fills the injection mold cavity. Preferably, at least part of a closed end portion of the injection mold cavity is defined by the porous material. Also, the step of drawing the material into the injection mold cavity may comprise substantially completely evacuating the mold cavity prior to injecting the material. The method may also include the step of heating one or both of an injection core or pin and at least one portion of the injection mold bounding the injection mold cavity, possibly including the porous material or insert, prior to the injecting step.

The step of blow molding the preform to create the container may comprise positioning the preform in a mold having at least two mating mold portions. The blow mold thus defines a cavity contoured to provide the container with a cross-sectional shape selected from the group consisting of substantially square, rectangular, circular, elliptical, or triangular. In one particular embodiment, the step of blow molding the preform to create the container includes positioning the preform in a mold having at least two mating portions that define a pyramid-shaped blow mold cavity. Accordingly, the resulting container is pyramid-shaped and includes a substantially smooth support surface. The step of blow molding may further include stretch blow molding a preform in a blow mold cavity using a stretch rod such that a portion of the preform is forced into engagement with a corresponding portion of the blow mold.

In addition, the method may further comprise the step of either embossing, engraving, or printing an indicia or placing a label on a smooth support surface of the container. This step may include placing a label or decal in a blow mold adjacent to the closed end of the preform prior to blow molding, or simply applying the label or decal on the container once it is removed from the mold.

In accordance with a second aspect of the invention, a system for molding an aesthetically and functionally enhanced container is disclosed. The system comprises an injection mold including a closed-end mold cavity for receiving an injection material through a side gate for forming a tubular preform having an open end and a closed end with a substantially smooth outer surface. A vacuum source is provided in communication with the mold cavity for drawing the material into the mold cavity to form the preform. The preform is then expanded using a blow mold apparatus to form the container, which as a result of the side gating and vacuum assist has a substantially smooth outer surface that is free from defects or gate marks.

In one embodiment, the injection mold cavity includes a neck portion for forming a neck of the preform adjacent to the open end thereof. The side gate may be located at or adjacent to the neck portion of the injection mold cavity, and may further include a conical exit portion so as to minimize the point of contact made with the preform once injection is complete. Also, at least a portion of the injection mold is comprised of a porous material at least partially defining the closed end of the injection mold cavity, in which case the vacuum source communicates with the porous material to maintain the vacuum in the injection mold cavity. To further improve the flow of material into the injection mold cavity, a heater may also be provided for heating one or more portions of the injection mold, including one or both of the core or pin and the porous material, prior to injecting the material.

In accordance with a third aspect of the invention, a method of forming an aesthetically and functionally enhanced container using combined injection and blow molding techniques is disclosed. The method comprises maintaining a vacuum in an injection mold cavity having a neck portion and a closed end portion for creating a tubular preform having an open end; injecting a material into the injection mold cavity through a gate located adjacent to the neck portion of the injection mold cavity and substantially away from the closed end portion; and cooling the material in the injection cavity to form the preform and create any mark or vestige of the gate at the neck portion adjacent to the open end. The preform then undergoes blow molding to create the container with an opening and a closed end having a substantially smooth outer surface.

In accordance with a fourth aspect of the invention, a system for molding an aesthetically and functionally enhanced container from a preform is disclosed. The system comprises an injection mold including a mold cavity having a closed end and a neck portion communicating with a side gate. Material is injected into the cavity through the side gate to form a tubular preform with an open end and a closed end having a substantially smooth outer surface. A vacuum source is provided for creating a negative pressure in the injection mold cavity at least partially during the injection of the material, and preferably both before and during the injection process. A blow molding apparatus is also provided for forming the preform into a container having a preselected shape. The resulting container is substantially free of defects and includes a closed end having a substantially smooth outer surface as the result of the positioning of the gate in the injection mold and the vacuum assist.

In accordance with a fifth aspect of the invention, a product container formed by blow molding a preform created by an injection molding process is disclosed. The container comprises a body having an opening for receiving a product, at least three sidewalls, and a connector wall contiguous with the sidewall. The connector wall and sidewall each have a substantially smooth outer surface with no gate mark or vestige resulting from the injection molding of the preform from which the container is formed. In one embodiment, the three sidewalls and the contiguous connector wall are each triangular in shape, whereby the product container is in the shape of a four-sided pyramid. In another embodiment, a fourth sidewall contiguous with at least two of the three sidewalls forming the container is provided, and the connector wall is substantially square in shape and contiguous with each of said at least four sidewalls. In a particular embodiment, the four sidewalls are triangular in shape, whereby the container is in the shape of a five-sided pyramid. A decoration or indicia may also be formed on or in the connector wall to identify the product or enhance the aesthetic appearance of the container, and a cap may be provided for covering or sealing the opening in the container.

In accordance with a sixth aspect of the invention, a method of forming a container having an open end and a closed end using combined injection and blow molding techniques is disclosed. The method comprises injecting a material through a single side gate into an injection mold cavity having an open end portion, a neck portion, and a closed end portion. The side gate is positioned adjacent to the neck portion and at least part of the mold cavity is bounded by a porous material. The method further includes assisting the material in filling the injection mold cavity using a vacuum in fluid communication with the porous material and cooling the material in the mold cavity to form a tubular preform with a closed end having a substantially smooth outer surface. The preform is then blow molded into a container having a predetermined shape and a substantially smooth outer surface along the closed end as a result of forming the preform using the side gate.

In accordance with a seventh aspect of the invention, a system for molding an aesthetically and functionally enhanced container is disclosed. The system comprises an injection mold including a closed-end mold cavity. An injection material is supplied to the cavity through a side gate to form a tubular preform having an open end and a closed end with a substantially smooth outer surface. At least part of the mold cavity is bounded by a porous material, preferably one having a pore size preferably in the range of between about 5–100 microns. A vacuum source is provided in communication with the porous material for assisting in drawing the material into the mold cavity to form the preform. A blow mold apparatus is also provided for forming the container from the preform such that it has a substantially smooth outer surface adjacent to a closed end.

BRIEF DESCRIPTION OF THE DRAWINGS

FIG. 4b is a schematic cross-sectional view of the blow molding apparatus of FIG. 4a;

DETAILED DESCRIPTION OF THE PREFERRED EMBODIMENTS

Figure 1:
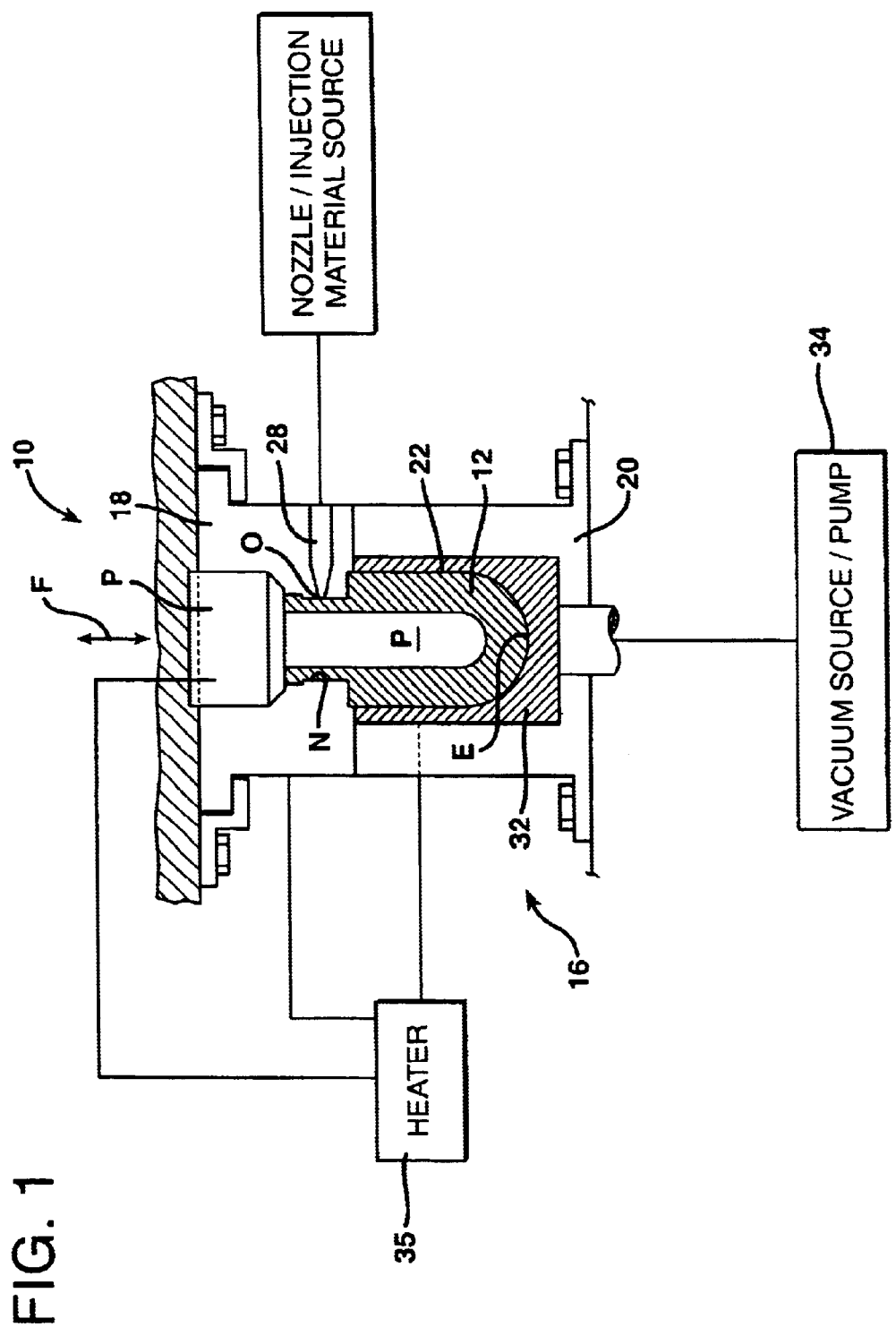
FIG. 1 is a partially schematic view of an exemplary injection molding apparatus for use in the system and method of the present invention or to assist in forming the novel article or container disclosed herein.

With reference to the drawings, a injection molding apparatus 10 for use in forming an improved preform 12 that may later be used during a blow molding process to create an article or container C having a smooth bottom is shown in FIG. 1. The apparatus 10 as illustrated includes an injection mold 16 formed by a pair of separable, but mating first and second mold portions 18, 20 (shown for purposes of illustration as upper and lower portions in FIG. 1) and an injection rod, core or pin P. At least one of the mold portions 18 or 20 and the injection rod, core or pin P are capable of being raised or lowered in a vertical direction (see the double headed action arrow F in FIG. 1). When brought together, these mold portions 18, 20 and the core or pin P define a cavity 22 into which a material or resin is injected to form the preform 12.

As is known in the art, the injection material may include polyethylene terephthalate (PET), polycarbonate, and/or other rigid or semi-rigid plastic materials or synthetic resins, possibly with additives for varying light transmission, color, strength, or other characteristics. Of course, other like materials may also be used to form the preform 12, depending on, among other things, the size and shape desired, inherent cost limitations, the required service life, and the particular type and amount of product being contained (liquid, semi-liquid, or even dry). As FIG. 1 further illustrates, the preform 12 is typically tubular in shape, being completely open at one end (usually the upper end, when the mold 10 is oriented as shown in FIG. 1), hollow in the middle, and closed at the opposite end (usually the lower end or bottom).

Figure 3:
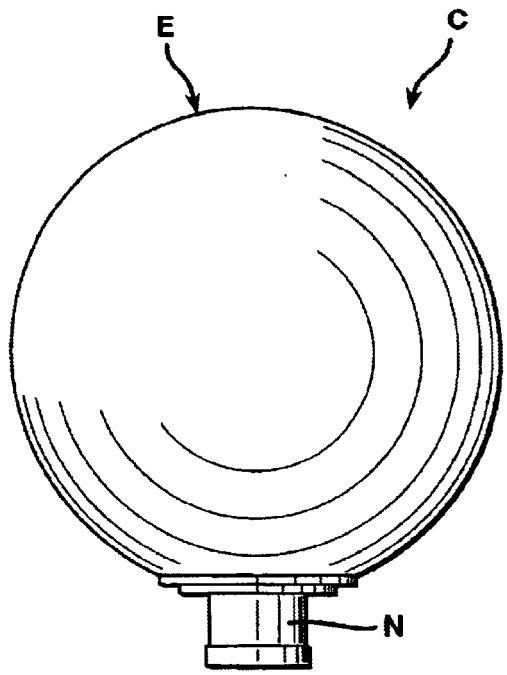
FIG. 3 is a side elevational view of the container apart from the blow molding apparatus of FIG. 2.

The upper mold portion 18 typically includes the portion of the cavity 22 that defines the neck N of the preform 12, which ultimately becomes the neck N of the molded article or container C after it is expanded to the desired shape by blow molding (see FIG. 3). The portion of the injection mold cavity 22 adjacent to the neck N may include undercuts or the recesses necessary to form a shoulder, ledges, or even threads for later engaging corresponding threads in a cap for containing and/or dispensing product from the article or container C (see FIG. 5). In contrast, the lower mold portion 20 defines the sidewalls and closed end E of the preform 12, which together ultimately define the closed end E portion of the article or container C once blow molding is complete (see FIG. 3). As is well known in the art, both portions 18, 20 also may optionally include transversely extending passages for receiving a cooling fluid, such as water, which decreases the time required for the resin or injection material to harden or cure to a predetermined level, and thus improves efficiency. For an example of an injection mold including such cooling passages, see Published PCT Application WO98/04396, assigned to A. K. Technical Laboratory, Inc., and U.S. Pat. No. 4,622,002 to Bormüth, the disclosures of which are incorporated herein by reference.

Figure 1A:
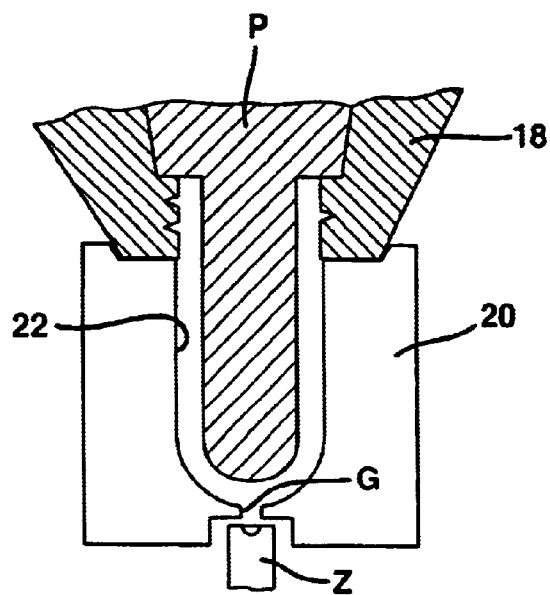
FIG. 1a is an example of a conventional technique for forming a preform using a bottom gate to supply the injection material.

Referring now briefly to FIG. 1a, the conventional approach for filling the injection mold cavity 22 uses a gate G through which the resin or other molten injection material is supplied from an extruder nozzle Z (often termed a "hot runner" nozzle in the art). Using this approach, a single gate G is located at or adjacent to the closed end E of the mold cavity 22, which is of course the portion that forms the closed end of the tubular preform 12. While this location is desirable from the standpoint that it is a relatively simple task to make sure that all areas of the cavity 22 are filled with the injection material or resin, it is deleterious in that a mark or vestige of the point of injection is ultimately made in the preform 12 once the mold portions 18, 20 are cooled. As mentioned above, while this gate mark is acceptable in some situations, such as where the closed end E of the preform 12 forms the support surface of the container C or article, it is less desirable in other situations, such as where: (1) the container C is inverted in use, such that the closed end E of the preform 12 forms a surface other than the support or bottom surface of the article in use, and is thus readily visible to a prospective purchaser (see FIG. 5); or (2) a decoration or indicia, such as a transfer, label, decalcomania, sticker, embossment, stamping, engraving, or the like, is placed on or formed in this outer surface (see FIGS. 6a–7b). In these cases, the position of even a small gate mark or defect detracts from the appearance of the article or container C, which may deter the prospective purchaser.

To eliminate the gate mark or vestige from this location, the present apparatus includes a gate 28 that communicates with a hot runner nozzle Z or other source of injection material or resin that is located along the vertically extending "side" of the cavity 22, away from the closed end (i.e., in a direction transverse to the longitudinal axis of the mold 16). In the embodiment illustrated in FIG. 1, this "side" gate 28 is located in the upper portion 18 of the injection mold, adjacent to the neck N of the article (i.e., adjacent the "neck" portion of the mold cavity 22). The gate 28 may have any shape, but preferably includes a conical portion at the end adjacent to the cavity 22 such that a relatively small opening O is provided through which the resin or injection material passes. This "pin" gate, as it is known in the art, creates a minimal point of contact between the material forming the preform 12 and the material remaining in the upstream portion of the gate 28. Hence, when the corresponding parts forming the upper mold portion 18 are removed or retracted to eject the preform 12 (or the blow molded article or container C, in the case of a single or multi-stage process performed using a common apparatus or system), the cold scrap material remaining in the side gate 28 after cooling, or "sprue" as it is known in the art, may be manually detached to create only a minimal gate mark or vestige at the neck N.

Figure 1B:
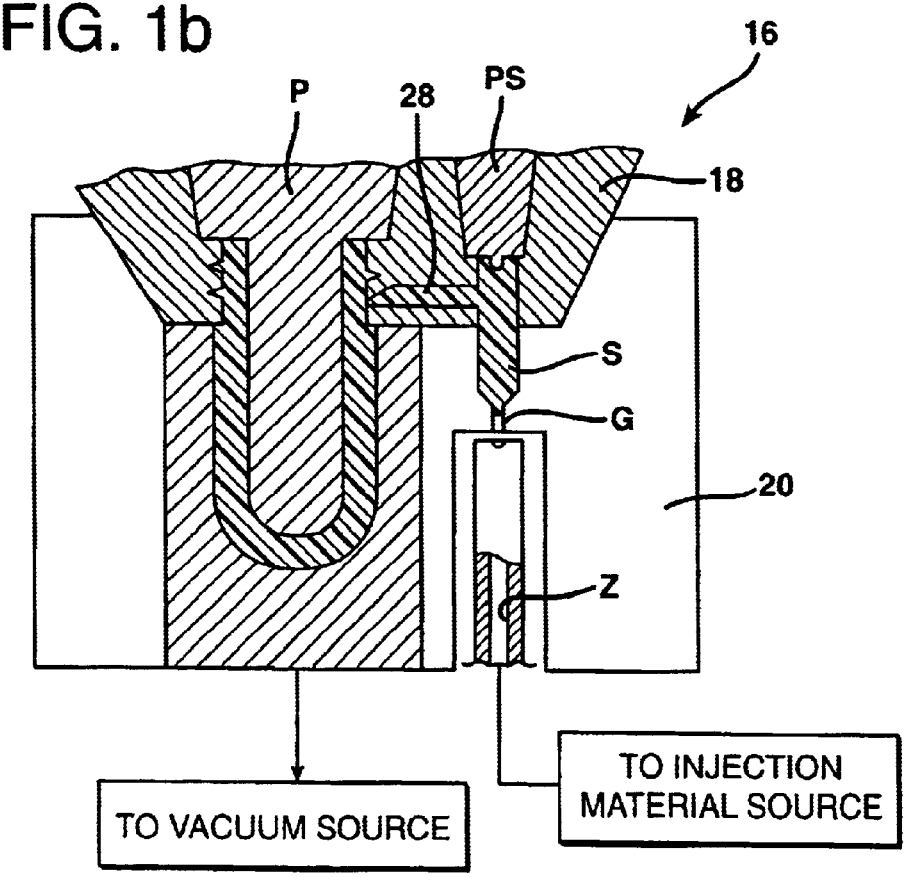
FIG. 1b is another version of an injection molding apparatus.

In FIG. 1b, a similar, but slightly different second embodiment, is illustrated. In this embodiment, the side gate 28 is positioned in the separable upper mold portion 18, which also includes a separate injection core or pin PS which assists in forming a T-shaped sprue S. In this embodiment, a separate hot runner nozzle Z supplies the molten resin or injection material through a conventional gate G. The material passes through the gate G to a side gate 28 and into the cavity 22 to form the preform 12. The sprue S is then removed with the upper mold portion 18. As described briefly above, the sprue S may be broken away and discarded after the preform 12 is ejected, if a separate blow molding apparatus is used, or after blow molding in the case that a one or two-stage injection/blow molding system is used. In both this case and the former case, the side gate 28 could also be provided at the interface between two separable portions of the injection mold 16, such as the upper and lower portions 18, 20, to facilitate later removal of the preform 12.

During experiments, it was found that the preform 12 may not be properly formed using a single side gate 28, since it is difficult to ensure that the material reaches all areas of the cavity 22. While multiple side gates could possibly be used to improve the performance, this increases not only the difficulty and expense of the molding process, but also the number of gate marks or vestiges found in the resulting molded article or container C. To solve this problem, a combination approach was discovered to produce optimum results.

In a first aspect of this approach, at least a portion of the injection mold cavity 22, and preferably all or substantially all of the portion surrounding the closed end E, is bordered by an insert 32 formed of a porous material. The particular material used is not critical (e.g., metal), but in the preferred embodiment, the size of the openings or pores is between about 5–100 microns. An example of a suitable material is stainless steel having a pore size of 20 microns.

At least a portion of this porous insert 32 is in fluid communication with a vacuum pump 34 or other source of negative pressure. The communication may be provided through an opening formed in the lower mold portion 20, as illustrated, or by direct contact in the case the entire lower portion of the mold 20 is fabricated from the porous material. The pump 34 may be an electric fan or any other type of device for substantially evacuating a space to create a substantial vacuum therein.

Preferably, the vacuum source (e.g., pump) is used prior to injecting the resin or material to evacuate the injection mold cavity 22, which may reduce or eliminate the need for vents to allow ambient air to escape during injection. During injection, the negative pressure supplied also serves to provide a vacuum assist function by drawing the injection material or resin into the cavity 22. This assist-function helps to ensure that the resin or injection material reaches all areas of the cavity 22 evenly, which in turn ensures that the resulting preform 12 is free from significant defects (both superficial and internal).

A second aspect of the improvement to further enhance the quality of the molded article or container C may involve the use of a heater 35 to warm the lower portion 20 of the mold and the core or pin P. The heating is preferably to a temperature of between about 15–80 degrees Celsius, depending on the thickness and the type of injection material/resin used. Hence, this optional heating, in combination with the side gating technique and vacuum assist described above, greatly improves the appearance and quality of the preform 12, which in turn improves the appearance and quality of the resulting blow molded articles or container C.

Figure 2:
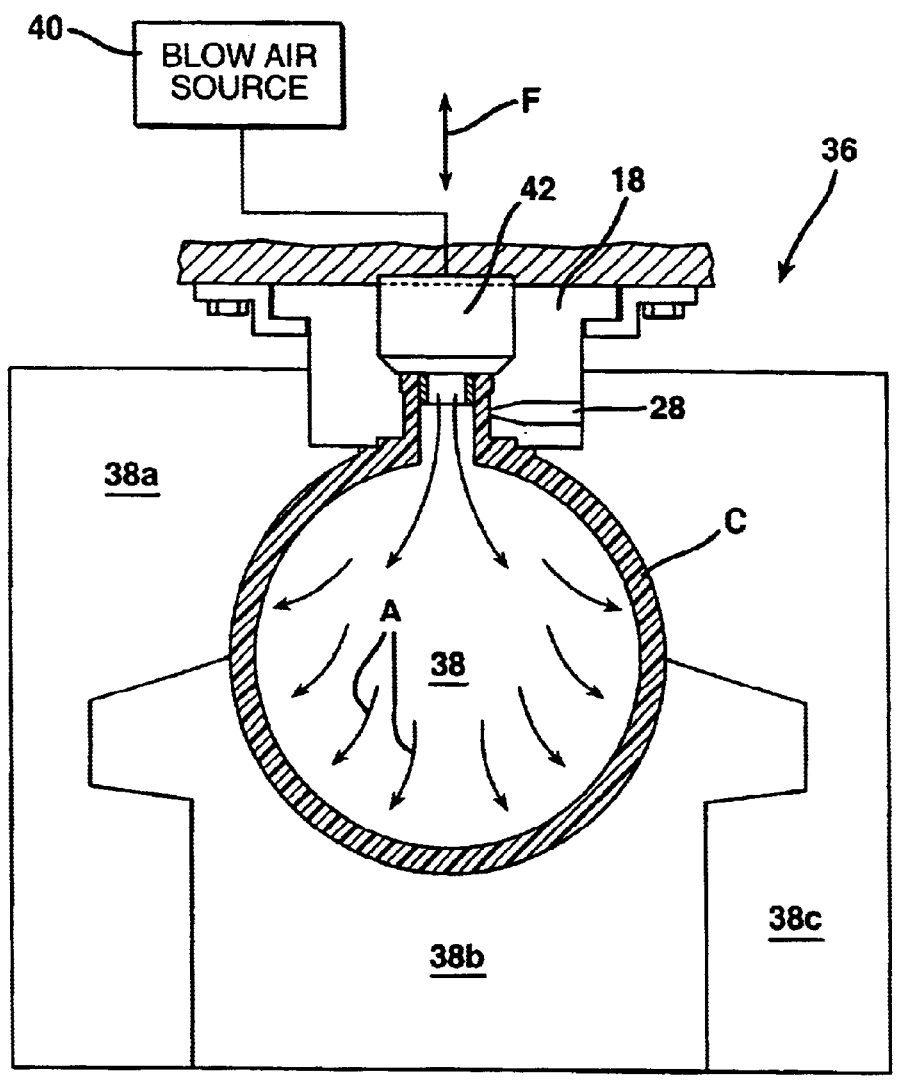
FIG. 2 is a mostly schematic view of a blow molding apparatus, including a partially cutaway, cross-sectional side view of the blow molded body of a container in the mold apparatus.

Turning now to FIG. 2, an example of a conventional blow molding apparatus or stage 36 forming part of a "two-stage" or station molding operation using a common apparatus or system is disclosed. The first stage involves forming the preform as described above at a first station, removing the injection core or pin P, and then removing the preform from the injection mold apparatus 10, such as by raising the upper portion 18 of the mold or lowering the lower portion 20. The blow mold apparatus or stage 36 is comprised of at least two separable mold portions, which are positioned over the preform 12 at a second "station" (which may actually be at the same physical location and part of the same system, but possibly a different machine). In the embodiment shown in FIG. 2, three such portions 38a–38c mate together to define a blow mold cavity 38. Specifically, the two side portions 38a and 38c close over a middle, lower or bottom portion 38b previously moved into position. As should be appreciated by one of skill in the art, the raising or lower of mold portions 18, 20, 38a–38c or the injection core pins P, PS, is easily accomplished using automated, computer controlled hydraulic or pneumatic motion systems, various types of which are well-known in the art.

Once the two or more mold portions 38a–38c are brought together over the preform 12, blow air under pressure is supplied from blow air source 40 through a nozzle 42 replacing the injection core or pin P (see action arrows A in FIG. 2). In addition to being under pressure, the air may be heated to assist in enabling the preform 12 to fully expand into and fill the blow mold cavity 38 defined by the mold portions 38a–38c. As described further below, a stretch rod may also be inserted into the mold cavity 38 via the opening in the nozzle 42 to assist in expanding the preform 12 (see FIG. 4b). The particular technique used depends on the size and shape of the article, the thickness, type, and temperature of the material used, the time available for completing the operation in an efficient, cost-effective manner, and various other well-known factors. Once the blowing operation is completed for a predetermined amount of time, the mold portions 38a–38c are retracted or withdrawn, and the upper mold portion 18 is manipulated to release the article or container C.

As a result of this combined technique, the resulting container C, which is shown as being substantially spherical for purposes of illustration only, has a substantially smooth, uninterrupted, and defect free outer surface. Hence, as shown in FIG. 3, when the container C is inverted in use, the upper portion (which of course was the bottom portion or closed end E of the preform 12 before undergoing blow molding) is free from any vestige or mark resulting from the injection of the material. Instead, any such mark is located adjacent to the neck N of the container C. This is an unobtrusive location that is normally not noticeable by the prospective purchaser, since a dispensing cap, cover, or the like is usually placed over the opening (such as over the threads typically formed along the neck N). The outer surface is also generally free from the bubbles, holes, dents, cavities or other defects resulting from the improper filling of the injection cavity 22 which may arise from using only a single side gate without a vacuum assist (which as mentioned above minimizes the number of gate marks created). The end result is a blow molded container C that is superior in terms of appearance and quality, which may be used for example in not only containing, but also self-promoting upscale cosmetics, including lotions, cremes, perfumes, or the like. As outlined further in the description that follows, the placement of a transfer, stamping, label, decalcomania, engraving, embossment, or other indicia on the outer surface of the closed end of the container C is also facilitated by creating any gate mark at or adjacent to the neck N and away from the closed end E.

Figure 4A:
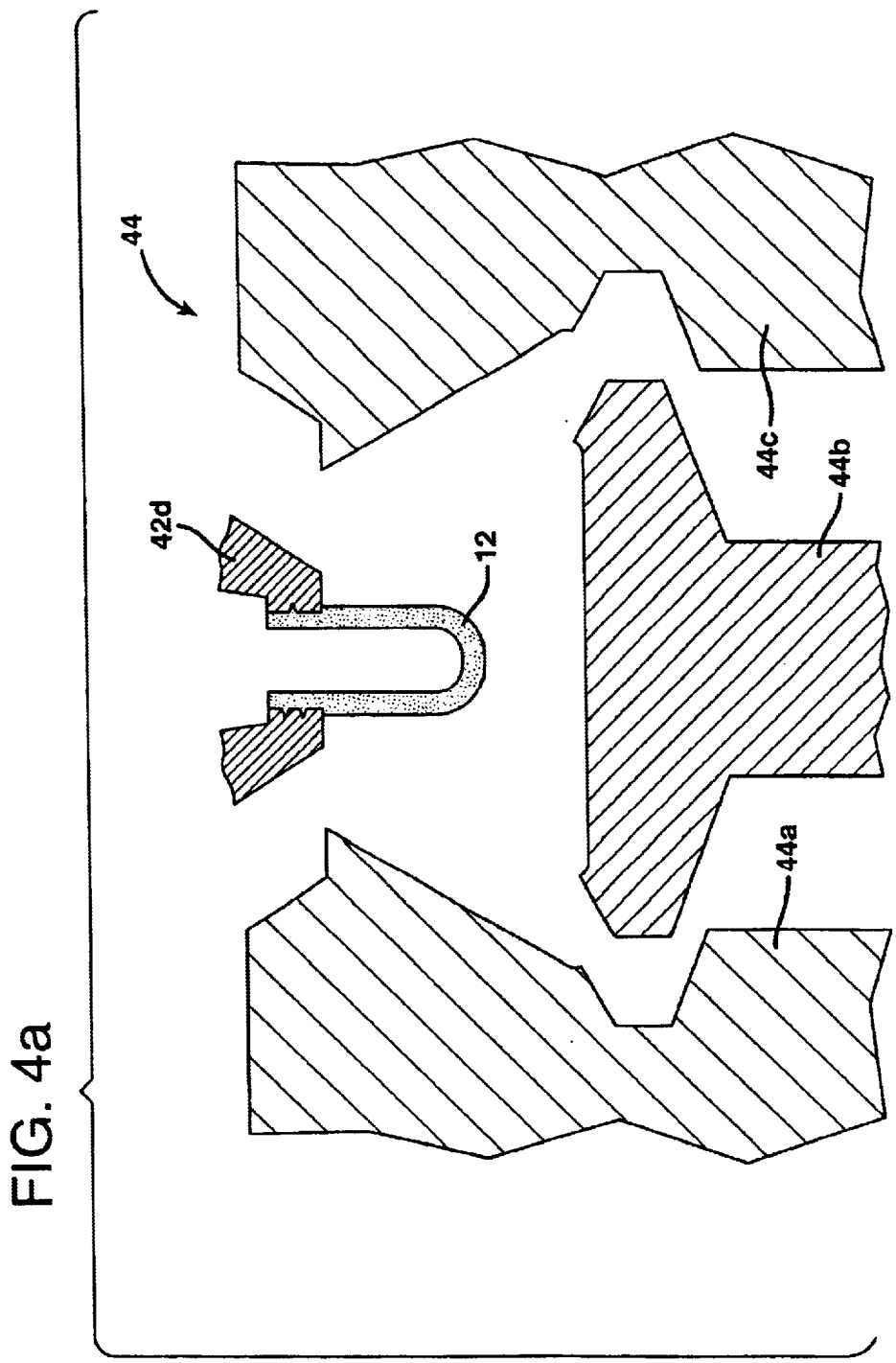
FIG. 4a is a schematic cross-sectional view shown another example of a blow molding apparatus for use in forming a blow molded article or container in the shape of a pyramid from a tubular preform having a closed end with a substantially smooth outer surface created using the injection molding technique disclosed herein.
Figure 4B:
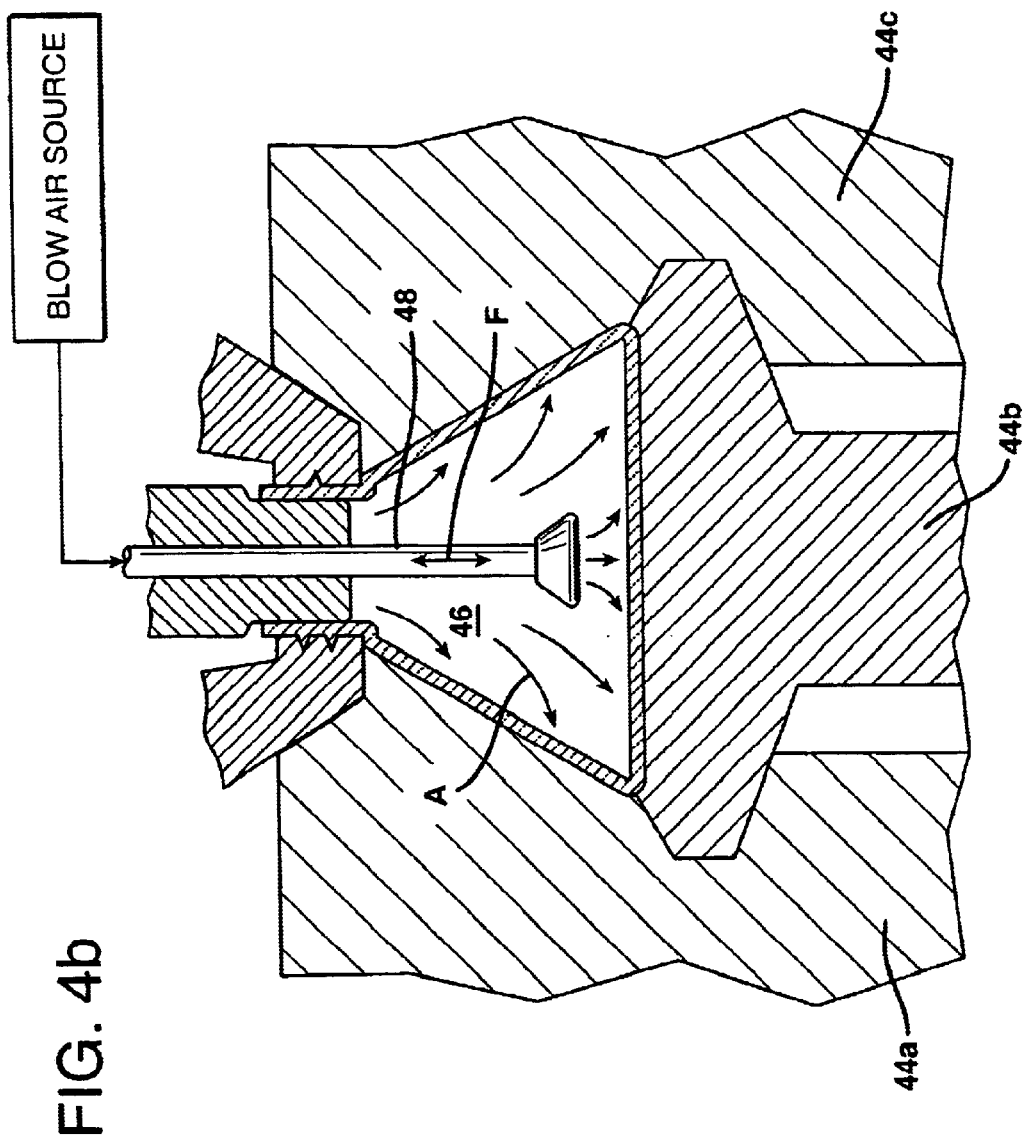
Figure 6A:
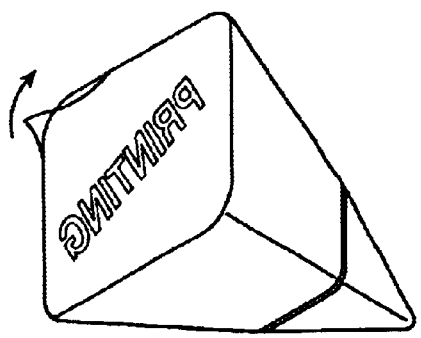
FIGS. 6a and 6b illustrate the manner in which printing or other indicia may be applied to the closed end of a blow molded article or container.
Figure 6B:
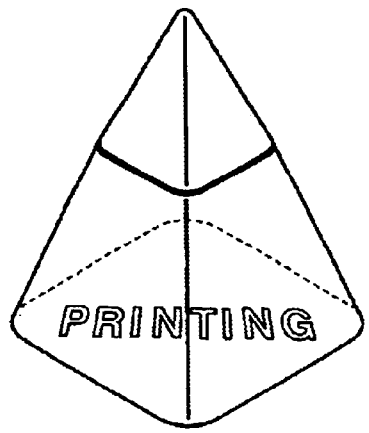

A particular implementation of the technology described above to form a blow molded article or container C having a special shape is shown in FIGS. 4a–7b. Turning first to FIG. 4a, a preform 12 formed using the techniques described above is positioned between a plurality of mold portions 44a–44c forming part of a blow molding apparatus 44. The open upper end of neck N of the preform 12 is held in place by another portion of the mold 44d, which may be the equivalent of the upper portion 18 of FIGS. 1, 1a, or 1b in the case where a single or multi-stage/multi-station molding operation is used. In any case, the mold portions 44a–44c are moved towards the preform 12 to define the mold cavity 46. In the case of the embodiment of FIGS. 4a and 4b, the three mold portions 44a–44c mate together over the preform 12 and have inner surface contours that define the cavity 46. In the illustrated embodiment, the side portions 44a and 44c are contoured to create an article or container C having the shape of a four or five-sided pyramid, as described further below. Hence, when the two side portions of the mold 44a, 44c are brought into mating engagement with the bottom portion 44b (which may be raised or lowered as necessary), the mold cavity 46 is thus formed around the preform 12.

Blow air is then supplied from a blow air source 40, substantially as described above (see action arrows A in FIG. 4b). Optionally, as shown in the illustrated embodiment, a stretch rod 48 is also used to facilitate the blow molding operation. This stretch rod 48 is moved in the vertical direction to assist in expanding the preform 12 into engagement with the inner surfaces or walls of the mold portions 44a–44c (see action arrow F in FIG. 4b). This stretching and engagement with the cavity 46 serves to create the blow molded article or container C having the desired shape. Of course, the use mold portions 44a–44c having different surface contours to create a mold cavity 46, and hence, a blow molded article or container C, having various shapes is possible and well-known in the art. In addition to articles having square, triangular, or circular cross-sections, as described above, other possible examples include articles having rectangular, elliptical, or even irregular cross-sections in either the horizontal or vertical planes, with or without a closed end that may serve as a support surface, such as when the container is in an upright position. For example, a frusto-conical or spherical container (not shown) could be formed with the neck at one end and a support surface at the opposite end.

Figure 5:
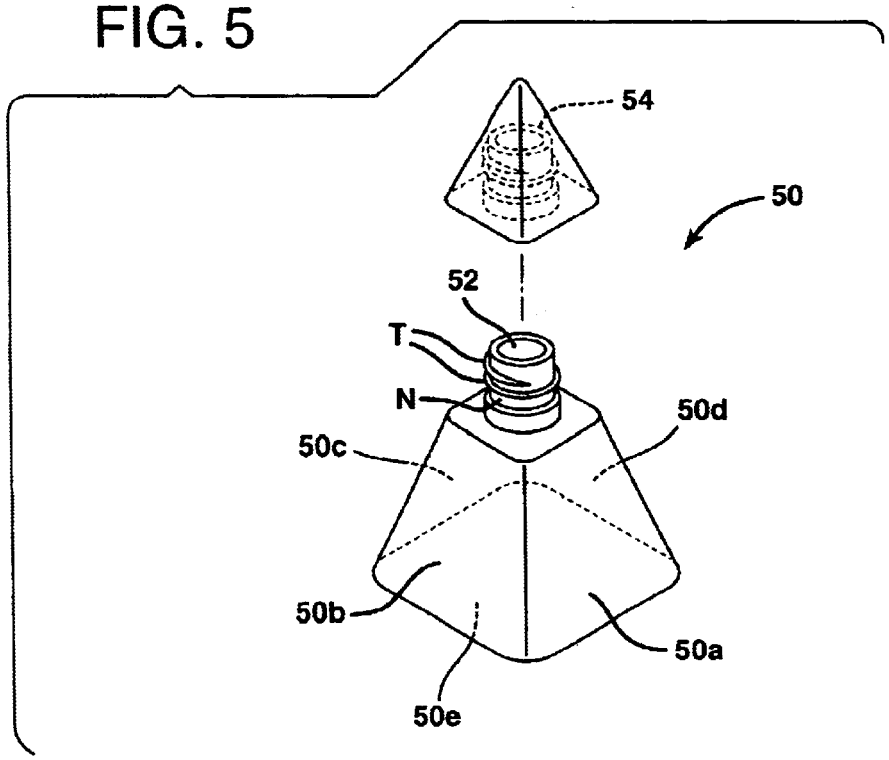
FIG. 5 is a perspective view of an open-top hollow article or container in the shape of a four-sided pyramid formed using the particular blow molding apparatus of FIGS. 4a and 4b.

Once the mold portions 44a–44c are separated, substantially as described above, the result is a hollow pyramid-shaped container 50, as shown in FIG. 5. In the illustrated embodiment, the container 50 includes four side walls 50a–50d, each of which is contiguous with a substantially square connector wall 50e, which is shown as the bottom wall. An opening 52 is provided in an upper portion of the container 50 for receiving a product. The neck N of the container 50 adjacent to the opening is preferably provided with threads T for receiving a removable "twist-on" style of cap 54, which may be formed by injection molding or the like.

Advantageously, as a result of blow molding the container 50 from a preform 12 creating using the injection molding technique with the side gate 28 and vacuum assist, as described above, the support surface provided by the connector wall 50e, as well as the sidewalls 50a–50d, have substantially smooth surfaces that are free of gate marks, defects, bubbles, or the like. This facilitates the application of a decalcomania 56, such as one having a reverse printed image, to the bottom of the pyramid-shaped container 50, using a suitable adhesive. In the case of a transparent or translucent container for holding a transparent or translucent liquid or semi-liquid product (mouthwash, astringents, etc.), the visual effect created by the printing on the bottom surface 50e enhances the distinctiveness and the overall attractiveness of the container C to the consumer, which could lead him or her to select that brand of product over another. Instead of a decal 56, it should be appreciated that any conventional means of forming an indicia on a surface may also be used, such as by the manual application of ink or paint, silk screening, hot stamping, heat transfer, or the like. As noted above, the indicia may also be applied during the blow molding process, such as for example by placing a label or decal directly in the mold cavity 46.

Figure 7A:
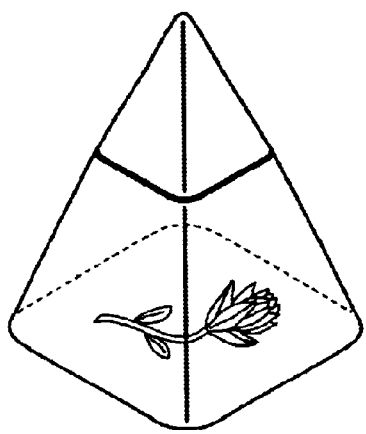
FIGS. 7a and 7b illustrate the manner in which engraving or embossments may be applied to the closed end of a blow molded article or container.
Figure 7B:
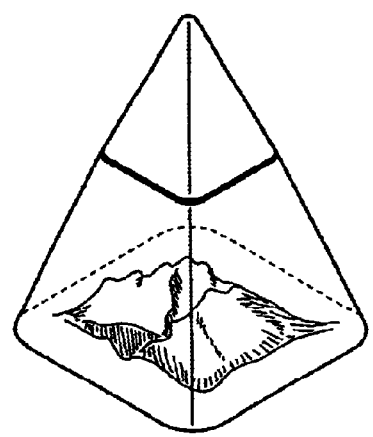

A related advantage is the ability of create an engraving 58 on the underside of the pyramid-shaped container 50, as shown in FIG. 7a, or to create embossments 60, as shown in FIG. 7b, such as by placing corresponding protrusions in the bottom portion 44b of the blow mold apparatus (or alternatively, by using a separate stamping apparatus once the molding operation is completed). In all cases, the attractiveness of the design formed in or on the container C is unfettered by the presence of gate marks or vestiges of the injection molding process and holes, pits, or other defects that result from the use of a single side gate alone. Of course, it should be appreciated that these particular decorating techniques are not restricted to pyramid-shaped containers, and may be applied to containers of any shape or size formed using the combined injection and blow molding techniques disclosed herein.

The foregoing description is presented for purposes of illustration and description of the various aspects of the invention. The descriptions are not intended to be exhaustive or to limit the invention to the precise form disclosed. Obvious modifications or variations are possible in light of the above teachings. For example, while the injection and blow molds are shown as being oriented with a longitudinal axis extending in the vertical direction, this particular orientation is not critical. Also, while only a single mold apparatus is shown, it should be appreciated that the system may include or method may be simultaneously practiced using several molds to increase production. The embodiments described above were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method of forming a container having an open end and a closed end using combined injection and blow molding techniques, comprising:

injecting a material through a side gate into an injection mold cavity having a closed end portion;
   drawing the material into the injection mold cavity using a vacuum;
   cooling the material in the mold cavity to form a tubular preform having a closed end with a substantially smooth outer surface; and
   blow molding the preform to a predetermined shape to form the container,
   whereby the closed end of the resulting container has a substantially smooth outer surface as a result of forming the preform using the side gate.

2. The method according to claim 1, wherein the injection mold cavity includes a neck portion, and the injecting step comprises injecting the material through the gate to the neck portion of the injection mold cavity.

3. The method according to claim 1, wherein at least a portion of the injection mold cavity is exposed to a porous material, and wherein the step of drawing the material into the injection mold cavity comprises placing a vacuum source in fluid communication with the porous material, whereby the vacuum action thus created assists in ensuring that the injection material completely fills the injection mold cavity.

4. The method according to claim 1, wherein at least part of a closed end portion of the injection mold cavity is bounded by a porous material, and wherein the step of maintaining a vacuum in the mold cavity comprises placing a vacuum source in communication with the porous material, whereby the vacuum action thus created assists in drawing the injection material from the side gate to completely fill the injection mold cavity.

5. The method according to claim 1, wherein the step of drawing the material into the injection mold cavity using a vacuum further comprises substantially completely evacuating the mold cavity prior to injecting the material.

6. The method according to claim 1, wherein the step of blow molding the preform to create the container includes positioning the preform in a mold having at least two mating mold portions, said blow mold defining a cavity contoured to provide the container with the predetermined shape having a cross-section selected from the group consisting of substantially square, rectangular, circular, elliptical, or triangular.

7. The method according to claim 1, wherein the step of blow molding the preform to create the container includes positioning the preform in a mold having at least two mating portions that define a pyramid-shaped blow mold cavity such that the resulting container is pyramid-shaped and includes a substantially smooth closed end.

8. The method according to claim 1, wherein the step of blow molding includes stretch blow molding a preform in a blow mold cavity using a stretch rod such that a portion of the preform is forced into engagement with a corresponding portion of the blow mold.

9. The method according to claim 1, further including the step of placing or forming an indicia on or in a closed end of the container.

10. The method according to claim 1, further including the step of placing a label or decal in a blow mold adjacent to the closed end of the preform prior to blow molding.

11. The method according to claim 1, further including the step of heating one or both of an injection core or pin and at least one portion of the injection mold bounding the injection mold cavity prior to the injecting step.

12. A method of forming an aesthetically and functionally enhanced container using combined injection and blow molding techniques, comprising:

maintaining a vacuum in an injection mold cavity having a neck portion and a closed end portion for creating a tubular preform having an open end;
   injecting a material into the injection mold cavity through a gate located adjacent to the neck portion of the injection mold cavity and substantially away from the closed end portion;
   cooling the material in the injection cavity to form the preform and create a mark or vestige of the gate at the neck portion adjacent to the open end; and
   blow molding the tubular preform to create the container with an opening and a closed end having a substantially smooth outer surface.

13. A method of forming a container having an open end and a closed end using combined injection and blow molding techniques, comprising:

injecting a material through a single side gate into an injection mold cavity having an open end portion, a neck portion, and a closed end portion, wherein the side gate is positioned adjacent to the neck portion and at least part of the mold cavity is bounded by a porous material;
   assisting the material in filling the injection mold cavity using a vacuum source in fluid communication with the porous material;
   cooling the material in the mold cavity to form a tubular preform with a substantially smooth outer surface adjacent to the closed end thereof; and
   blow molding the preform to a predetermined shape to form the container;
   whereby the resulting container has a substantially smooth outer surface along the closed end as a result of forming the preform using the side gate.

14. A method of forming a container having an open end and a closed end using combined injection and blow molding techniques, comprising:

injecting a material through a side gate into an injection mold cavity having a closed end portion and a portion exposed to a porous material;

drawing the material into the injection mold cavity using a vacuum source in fluid communication with the porous material thereby ensuring that the material completely fills the injection mold cavity;

cooling the material in the mold cavity to form a tubular preform having a closed end with a substantially smooth outer surface; and blow molding the preform to a predetermined shape to form the container, whereby the closed end of the resulting container has a substantially smooth outer surface as a result of forming the preform using the side gate.

15. A method of forming a container having an open end and a closed end using combined injection and blow molding techniques, comprising:

injecting a material through a side gate into an injection mold cavity having a closed end portion;

drawing the material into the injection mold cavity using a vacuum;

cooling the material in the mold cavity to form a tubular preform having a closed end with a substantially smooth outer surface;

blow molding the preform to form the container; and placing or forming an indicia on or in the closed end of the container adjacent to the substantially smooth outer surface.

16. The method according to claim 15, wherein the placing or forming step comprises silk screening the indicia on the closed end of the container.

17. The method according to claim 15, wherein the placing or forming step comprises creating an embossment on the closed end of the container during the blow molding step.

18. The method according to claim 15, wherein the placing or forming step comprises placing a decal on the closed end of the container.

19. The method according to claim 15, wherein the placing or forming step comprises stamping the indicia on the closed end of the container.

20. A method of forming a container having an open end and a closed end using combined injection and blow molding techniques, comprising:

injecting a material through a side gate into an injection mold cavity having a closed end portion;

drawing the material into the injection mold cavity using a vacuum;

cooling the material in the mold cavity to form a tubular preform having a closed end with a substantially smooth outer surface;

placing a label or decal in a blow mold adjacent to the closed end of the preform; and blow molding the preform to form the container, whereby the closed end of the resulting container has a substantially smooth outer surface adjacent the label or decal as a result of forming the preform using the side gate.

* * * * *